(12) United States Patent
Ramakrishnan

(10) Patent No.: US 11,140,343 B1
(45) Date of Patent: Oct. 5, 2021

(54) IMAGE SENSORS HAVING AN ADJUSTABLE CURRENT SOURCE FOR COLUMN SETTLING SPEEDUP

(71) Applicant: SEMICONDUCTOR COMPONENTS INDUSTRIES, LLC, Phoenix, AZ (US)

(72) Inventor: Shankar Ramakrishnan, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/929,729

(22) Filed: May 19, 2020

(30) Foreign Application Priority Data

Mar. 31, 2020 (IN) .............................. 202011014251

(51) Int. Cl.
*H04N 5/369* (2011.01)
*H04N 5/378* (2011.01)
*H04N 5/3745* (2011.01)

(52) U.S. Cl.
CPC ........... *H04N 5/3698* (2013.01); *H04N 5/378* (2013.01); *H04N 5/3745* (2013.01)

(58) Field of Classification Search
CPC ..... H04N 5/3698; H04N 5/3745; H04N 5/378
See application file for complete search history.

(56) References Cited

U.S. PATENT DOCUMENTS

| | | | |
|---|---|---|---|
| 7,012,645 B1 * | 3/2006 | Tsai ................... | H01L 27/14609 257/E27.132 |
| 10,116,892 B1 * | 10/2018 | Wang ................. | H04N 5/37452 |
| 10,348,991 B2 * | 7/2019 | Nakamizo ............. | H04N 5/355 |
| 2007/0241258 A1 | 10/2007 | Altice | |
| 2008/0054164 A1 | 3/2008 | Johansson | |
| 2015/0208008 A1 * | 7/2015 | Gendai ................ | H04N 5/3698 250/208.1 |
| 2016/0080616 A1 * | 3/2016 | Gendai ................. | H04N 5/378 348/374 |

OTHER PUBLICATIONS

Freson, U.S. Appl. No. 16/502,381, filed Jul. 3, 2019.
George et al., "Current Sensing-Assisted Active Pixel Sensor for High-Speed CMOS Image Sensors." IEEE Sensors Journal (vol. 15, Issue: 8, Aug. 2015), pp. 4365-4372.

* cited by examiner

*Primary Examiner* — Nhan T Tran
*Assistant Examiner* — Chriss S Yoder, III
(74) *Attorney, Agent, or Firm* — Treyz Law Group, P.C.; Joseph F. Guihan

(57) ABSTRACT

An image sensor may include an array of imaging pixels arranged in rows and columns. Each column of imaging pixels may be coupled to a respective column output line. Each column output line may be coupled to readout circuitry that includes an adjustable current source, sample and hold circuitry, and slew rate sensing and current source control circuitry. To decrease the settling time of the column output line, the slew rate sensing and current source control circuitry may increase the magnitude of a bias current provided by the adjustable current source when the slew rate of the output voltage is above a threshold. When the slew rate of the output voltage is below the threshold, the bias current may revert to a lower magnitude to conserve power.

20 Claims, 5 Drawing Sheets

IMAGE SENSORS HAVING AN ADJUSTABLE CURRENT SOURCE FOR COLUMN SETTLING SPEEDUP

This application claims the benefit of and claims priority to Indian Patent Application No. 202011014251, filed Mar. 31, 2020, which is hereby incorporated by reference herein in its entirety.

BACKGROUND

This relates generally to imaging devices, and more particularly, to imaging sensors having column lines for pixel readout.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

As image sensors increase in both pixel resolution and frame rate, the amount of time available to read out signals from each row in the image sensor decreases. If care is not taken, there may be insufficient time to properly readout out signals from the image sensor. In these situations, signals may be undesirably attenuated or undesirably large power consumption levels may be needed to readout signals without attenuation.

It would therefore be desirable to be able to provide improved readout techniques that allow for the sampling of unattenuated signals during short time frames.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
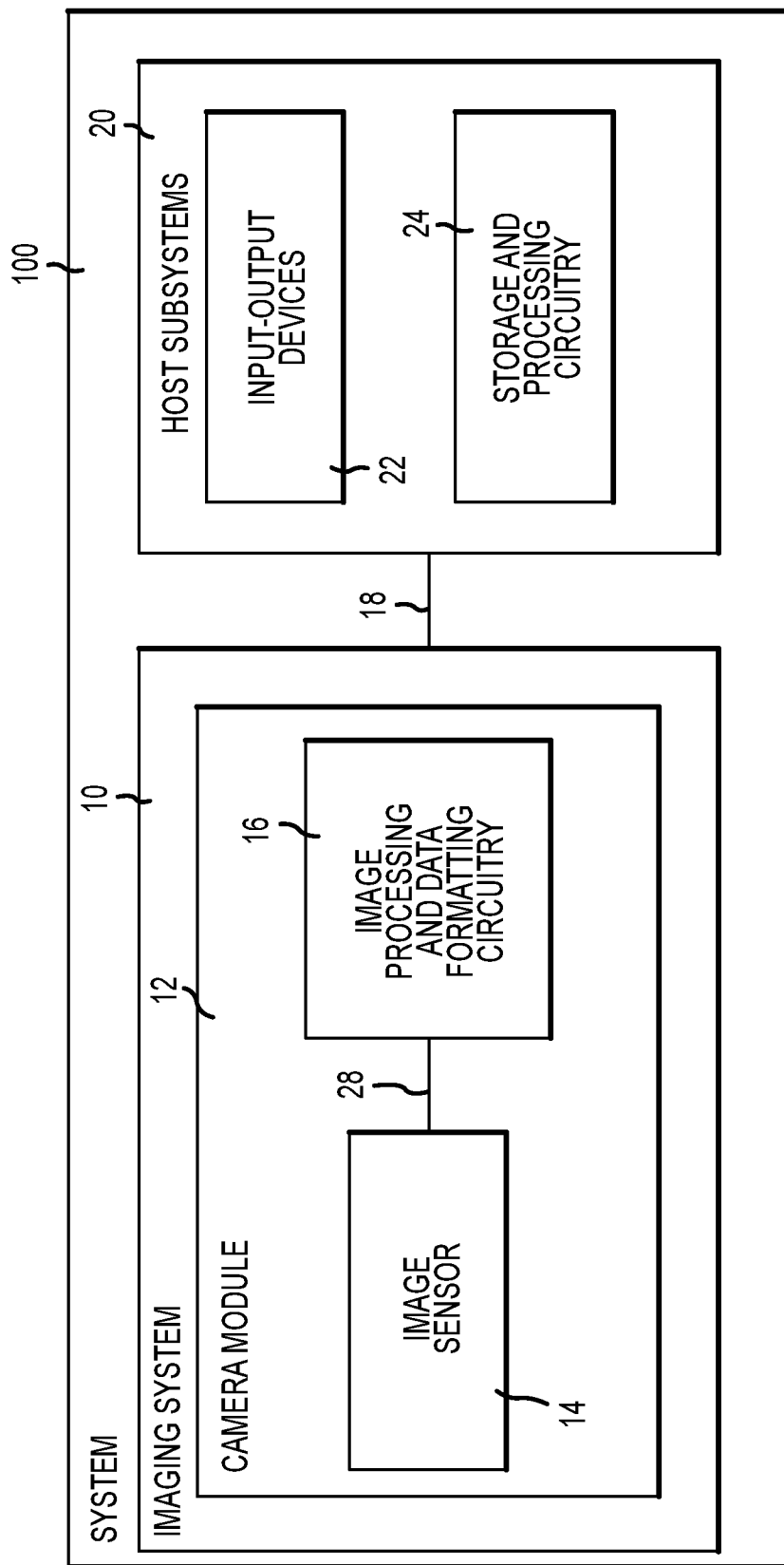
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
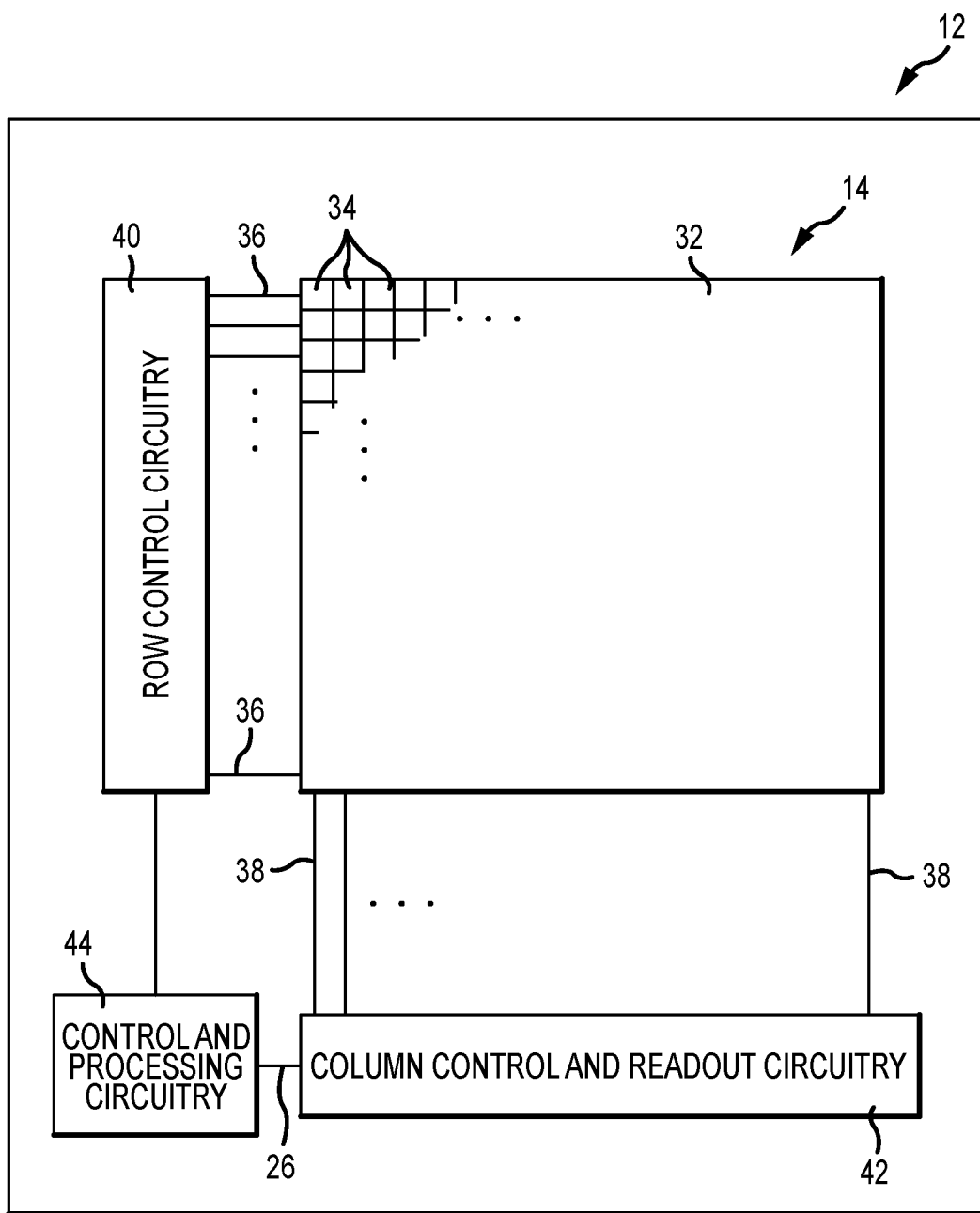
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data and control path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

Figure 3:
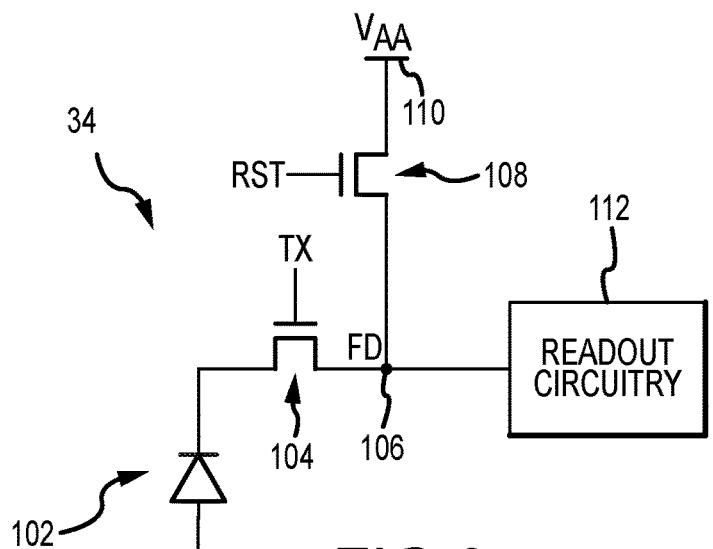
FIG. 3 is a diagram of an illustrative imaging pixel that is coupled to readout circuitry in accordance with an embodiment.

FIG. 3 is a diagram of an illustrative imaging pixel that may be included in an image sensor. As shown in FIG. 3, imaging pixel 34 may include a photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion region 106 (FD) (which may have an associated floating diffusion capacitance). A reset transistor 108 may be coupled between floating diffusion region FD and bias voltage supply terminal 110. Bias voltage supply terminal 110 may provide a bias voltage ($V_{AA}$). Photosensitive element 102 may be a doped semiconductor region (e.g., a region in a silicon substrate that is doped by ion implantation, impurity diffusion, or other doping process). Floating diffusion region FD may also be a doped semiconductor region. Floating diffusion region 106 is coupled to readout circuitry 112. Readout circuitry 112 may be configured to sample the charge at floating diffusion region 106.

In this application, each transistor is illustrated as having three terminals: a source, a drain, and a gate. The source and drain terminals of each transistor may be changed depending on how the transistors are biased and the type of transistor used. For the sake of simplicity, the source and drain terminals are sometimes referred to herein as source-drain terminals or simply terminals.

A gate terminal of transfer transistor 104 receives control signal TX. A gate terminal of reset transistor 108 receives control signal RST. Control signals TX and RST may be provided by row control circuitry (e.g., row control circuitry 40 in FIG. 2) over control paths (e.g., control paths 36 in FIG. 2).

During operation of the imaging pixel, photodiode 102 may accumulate charge in response to incident light. The amount of charge accumulated in photodiode 102 may be proportional to the intensity of the incident light and the integration time (e.g., the exposure time). When it is desired to sample the amount of charge accumulated in photodiode 102, transfer transistor 104 may be asserted (by asserting control signal TX). Asserting transfer transistor 104 transfers charge from photodiode 102 to floating diffusion region 106. The charge in floating diffusion region 106 may then be sampled by readout circuitry 112. Reset transistor 108 may be asserted to reset the charge at floating diffusion region 106. Reset transistor 108 and transfer transistor 104 may be asserted to reset the charge at photodiode 102.

It should be noted the arrangement of pixel 34 herein is merely illustrative. In general, any desired pixel circuitry may be used. The pixel may include an anti-blooming transistor, a dual conversion gain transistor, a dual conversion gain capacitor, one or more overflow capacitors, one or more overflow transistors, one or more charge storage regions in addition to the floating diffusion region, etc.

FIG. 3 shows a single imaging pixel that is coupled to readout circuitry 112. It should be understood that, in practice, an image sensor may include an array of imaging pixels arranged in rows and columns. Each column of imaging pixels in the image sensor may be coupled to respective readout circuitry (e.g., at least some of the readout circuitry is shared between pixels in a given column). This type of arrangement is shown in FIG. 4.

Figure 4:
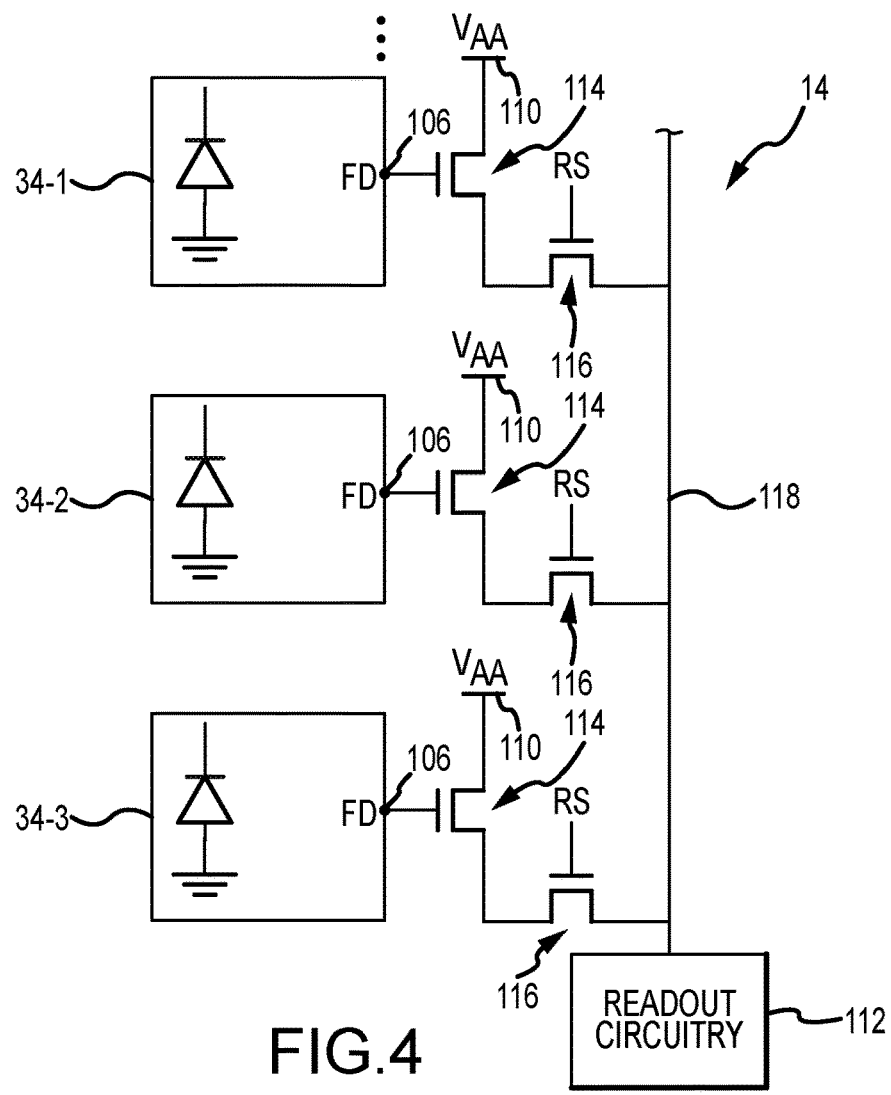
FIG. 4 is a diagram of an illustrative image sensor having a column of imaging pixels coupled to readout circuitry in accordance with an embodiment.

FIG. 4 is a diagram of an image sensor 14 including imaging pixels in a single column that are coupled to readout circuitry 112. FIG. 4 shows imaging pixels 34-1, 34-2, and 34-3 in a given column of imaging pixels. Each imaging pixel may include any desired pixel circuitry, as discussed above in connection with FIG. 3. In one example, the pixels 34-1, 34-2, and 34-3 may include the photodiode, transfer transistor, floating diffusion region, and reset transistor of FIG. 3.

FIG. 4 explicitly shows how each imaging pixel may include a floating diffusion region 106 coupled to a source follower transistor 114. Each source follower transistor 114 (SF) has a gate terminal coupled to floating diffusion region FD (and optionally a first terminal of reset transistor 108 in FIG. 3). Source follower transistor 114 also has a first source-drain terminal coupled to bias voltage supply terminal 110. The second source-drain terminal of the source follower transistor is coupled to row select transistor 116. Row select transistor 116 is coupled between source follower transistor 114 and column output line 118. Each pixel in a given column may be coupled to respective column line 118. Each column line may be coupled to respective readout circuitry 112.

A gate terminal of row select transistor 116 receives control signal RS. Control signal RS may be provided by row control circuitry (e.g., row control circuitry 40 in FIG. 2) over control paths (e.g., control paths 36 in FIG. 2). When a given row of pixels is being read out, that row's control signal RS may be asserted to connect that row of pixels to the column output lines. The rows of pixels may be read out in a row-by-row manner (with each row subsequently being coupled to the column output line 118 and readout circuitry 112).

Source follower transistor 114 and row select transistor 116 are included in each pixel in the array, but may be used for readout operations. These transistors may sometimes be referred to as per-pixel readout circuitry. These transistors may also be considered to be part of pixels 34. These transistors may also be considered to be part of readout circuitry 112.

Figure 5:
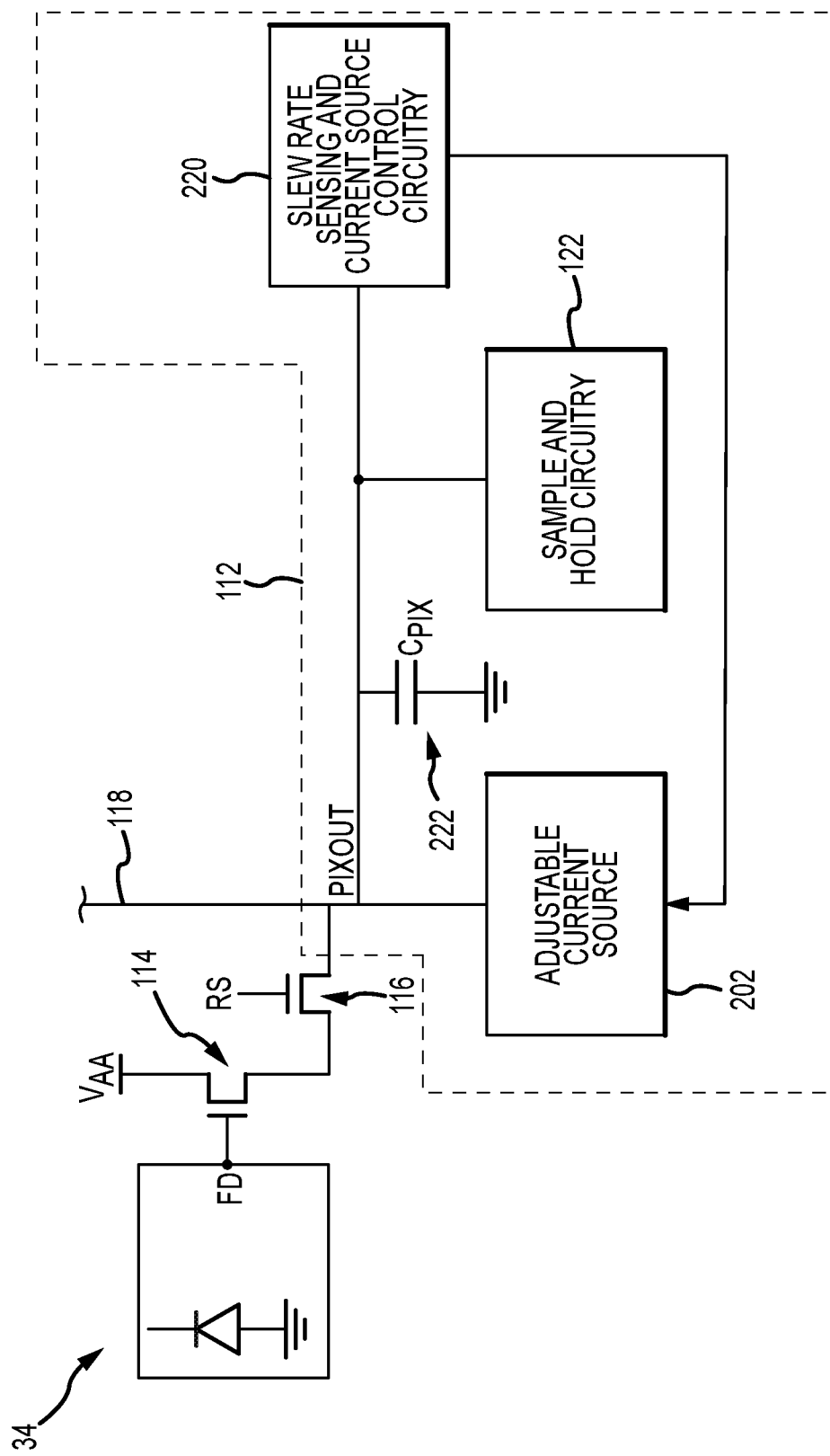
FIG. 5 is a diagram showing illustrative readout circuitry in an image sensor that includes an adjustable current source and slew rate sensing and current source control circuitry in accordance with an embodiment.

FIG. 5 is a schematic diagram showing an illustrative arrangement for readout circuitry 112. As shown, column output line 118 (with output voltage PIXOUT) may be coupled to an adjustable current source 202. Sample and hold circuitry 122 is also coupled to column output line 118 and pixel capacitor 222 (Cpix). Additionally, slew rate sensing and current source control circuitry 220 (sometimes referred to as control circuitry 220, current source control circuitry 220, slew rate sensing circuitry 220, etc.) is coupled to column output line 118 (and thus output voltage PIXOUT).

When it is desired to sample a signal from the floating diffusion region FD, row select transistor 116 may be asserted. After the row select transistor is asserted, sample and hold circuitry 122 may be used to obtain and store the voltage (PIXOUT) of column output line 118 that is indicative of the voltage on floating diffusion region FD. However, there may be a delay between asserting row select transistor 116 and the settling of the voltage (PIXOUT) of column output line 118. This delay may sometimes be referred to as the settling time. In general, the settling time may be inversely proportional to the magnitude of the total bias current provided by current source 202.

Adjustable current source 202 may provide a bias current ($I_{BIAS}$). Adjustable current source 202 may increase the magnitude of the bias current when the slew rate of PIXOUT is greater than a threshold. Slew rate may refer to the change in voltage over time of PIXOUT. When the slew rate is low, PIXOUT is not changing quickly and is therefore close to having settled. For example, a slew rate of 0 means that PIXOUT has completely settled. If the slew rate is high, PIXOUT is changing quickly and is therefore in the middle of the settling process. Increasing the bias current when the slew rate is high therefore ensures that the settling time is reduced. However, once PIXOUT has settled, the bias current is reduced to a lower magnitude. This ensures that the settling time is fast enough for unattenuated readout even at fast frame rates and high resolution. However, because the higher current magnitude is only applied when needed, power consumption is minimized.

Slew rate sensing and current source control circuitry 220 may detect the slew rate of PIXOUT and control adjustable current source 202 accordingly. For example, when the slew rate is above a threshold, slew rate sensing and current source control circuitry 220 increases the bias voltage supplied by adjustable current source 202. When the slew rate drops below the threshold, slew rate sensing and current source control circuitry 220 decreases the bias voltage supplied by adjustable current source 202. The slew rate threshold may be any desired value (e.g., 5 V/µs, greater than 1 V/µs, greater than 0.1 V/µs, greater than 10 V/µs, greater than 25 V/µs, less than 1 V/µs, less than 0.1 V/µs, less than 10 V/µs, less than 25 V/µs, between 1 V/µs and 20 V/µs, between 1 V/µs and 10 V/µs, between 4 V/µs and 6 V/µs, etc.).

Sample and hold circuitry 122 may include any desired components. For example, sample and hold circuitry 122 may include one or more capacitors, one or more analog-to-digital converters, one or more digital-to-analog converters, one or more comparators, one or more reference voltage supplies, etc.

Figure 6:
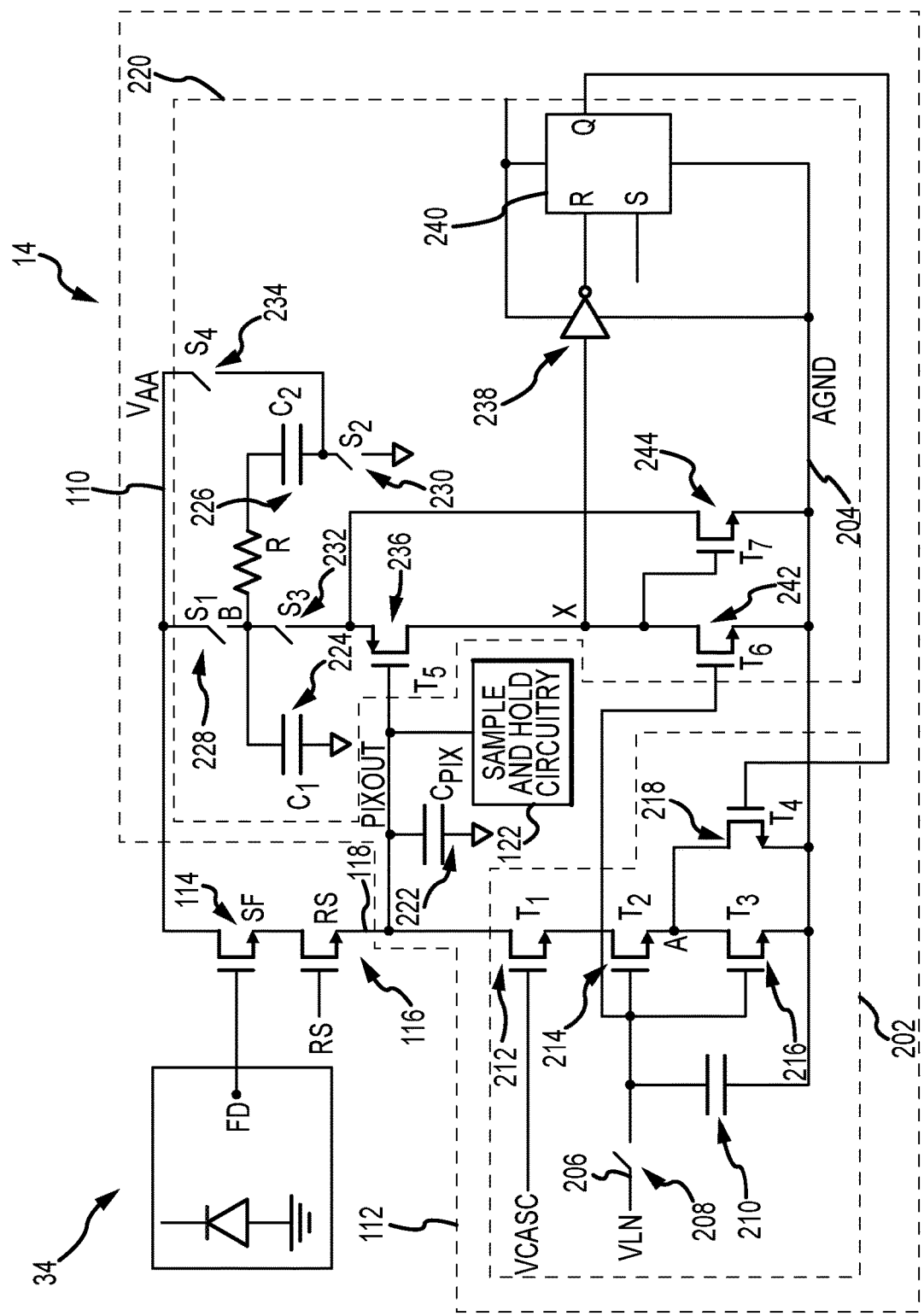
FIG. 6 is a diagram showing illustrative components of the adjustable current source and slew rate sensing and current source control circuitry of FIG. 5 in accordance with an embodiment.

FIG. 6 is a diagram showing an illustrative arrangement for adjustable current source 202 and slew rate sensing and current source control circuitry 220. Current source 202 includes transistors 212 (T1), 214 (T2), and 216 (T3) coupled in series between row select transistor 116 and ground (e.g., a ground voltage AGND provided by bias voltage supply terminal 204). Bias voltage supply terminal 204 may sometimes be referred to as ground voltage supply terminal 204, ground terminal 204, ground 204, etc. A bias voltage VLN is provided from bias voltage supply terminal 206 to the gates of transistors 214 and 216. A switch 208 may optionally be included between the bias voltage supply terminal 206 and the gates of T2 and T3. Capacitor 210 may be coupled between bias voltage supply terminal 206 and ground terminal 204.

Transistor 212 is an optional cascode transistor that is coupled between row select transistor 116 and transistor 214. Transistor 218 (T4) has a first terminal that is coupled to a node A that is interposed between T2 and T3. The second terminal of transistor 218 is coupled to ground. T4 may therefore effectively short out T3 from being in series with T2. When T2 and T3 are connected in series, The T2/T3 combination acts as one current device and uses more current than when T3 is shorted out. Therefore, when T4 is asserted and T3 is shorted out, the magnitude of the bias current provided by current source 202 increases.

Current source 202 applies a current (e.g., $I_{BIAS}$) to the column output line. As the magnitude of $I_{BIAS}$ increases, the settling time associated with sampling a voltage onto column output line 118 decreases. Therefore, a large $I_{BIAS}$ may ensure that the settling time is fast enough for unattenuated readout even at fast frame rates and high resolution. However, despite desirably decreasing the settling time, increasing bias current $I_{BIAS}$ may also undesirably increase power consumption, reduce output swing, and increase noise.

To decrease settling time while mitigating power consumption, the image sensor of FIG. 6 allows for selective increasing of the total bias current applied to the column output line using current source 202 (sometimes referred to as adjustable current source 202, variable current source 202, etc.). When transistor 218 (T4) is deasserted, the bias current may be at a first magnitude (e.g., $I_{BIAS\_2}$). Asserting transistor 218 may increase the bias current to a second magnitude (e.g., $I_{BIAS\_2}$) that is greater than the first magnitude.

Transistor 218 in adjustable current source 202 may be asserted (to raise the bias current magnitude) only when the slew rate of PIXOUT is greater than a threshold. When the slew rate is low, PIXOUT is not changing quickly and is therefore close to having settled. In this case, transistor 218 may be deasserted since additional current is not required to speed up settling. If the slew rate is high, PIXOUT is changing quickly and is therefore in the middle of the settling process. In this case, transistor 218 may be asserted to increasing the bias current and speed up settling. However, once PIXOUT has settled (and the slew rate drops below the threshold), the bias current is reduced to a lower magnitude.

In order to control adjustable current source 202 based on slew rate, readout circuitry 112 includes slew rate sensing and current source control circuitry 220. Slew rate sensing and current source control circuitry 220 includes a transistor 236 (T5) having a gate coupled to column output line 118. Transistor 236 may therefore be referred to as a source follower transistor. Transistor 236 has a source terminal coupled to switch 232 (S3). S3 is coupled between transistor 236 and node B. A first capacitor 224 ($C_1$) is coupled to node B. A second capacitor 226 ($C_2$) is also coupled to node B. An intervening resistor R is coupled between node B and capacitor $C_2$. A switch 228 (S1) is coupled between node B and bias voltage supply terminal 110. A switch 230 (S2) is coupled between capacitor $C_2$ and ground. A switch 234 (S4) is coupled between capacitor $C_2$ and bias voltage supply terminal 110.

Transistor 242 (T6) has a first terminal coupled to transistor 236 (e.g., the source terminal of T6 is coupled to the drain terminal of T5). Transistor 242 has a second terminal coupled to ground and a gate terminal that is coupled to bias voltage supply terminal 206. Transistor 244 (T7) has a first terminal coupled to transistor 236 (e.g., the source terminal of T7 is coupled to the source terminal of T5). Transistor 244 has a second terminal coupled to ground and a gate terminal that is coupled between node X and T6. Node X is coupled between transistor 236 and transistor 242.

Node X is coupled to the input of inverter 238. Therefore, inverter 238 outputs an inverted version of the voltage at node X. The output of inverter 238 is coupled to the R-input of latch circuit 240 (sometimes referred to as flip-flop 240 or SR latch 240). Latch circuit 240 has an R-input, an S-input, and an output (Q). Both the inverter and latch circuit may be coupled between a power supply and ground, as shown in FIG. 6. The output of latch circuit 240 may be provided to the gate terminal of transistor 218. Therefore, the output of latch circuit 240 controls the adjustable current source 202 by selectively asserting transistor T4.

Each one of switches S1, S2, S3, and S4 in FIG. 6 may be formed by a transistor, a mechanical switch (e.g., a single-pole switch), or any other desired type of switch. In one illustrative example, each of switches S1, S2, S3, and S4 is formed form a transistor (and may be referred to as transistor S1, S2, S3, and S4). Each transistor may have a gate that receives a control signal. Switches S1 and S2 may receive the same control signal (e.g., a first control signal) and switches S3 and S4 may receive the same control signal (e.g., a second control signal). The second control signal may be the inverse of the first control signal, in one example.

In this type of arrangement, a single control signal may be used to control all of transistors S1, S2, S3, and S4. In this type of arrangement, S1 and S2 are always in the same state (e.g., both asserted or both deasserted), S3 and S4 are always in the same state (e.g., both asserted or both deasserted), and the state of S3 and S4 is the opposite of the state of S1 and S2.

Before readout, switches S1 and S2 are closed (e.g., asserted) and S3 and S4 are opened (e.g., deasserted). In this arrangement, capacitor $C_1$ is coupled between bias voltage supply terminal 110 and ground and is pre-charged to $V_{AA}$. Capacitor $C_2$ is also coupled between bias voltage supply terminal 110 and ground and is pre-charged to $V_{AA}$. After the transfer transistor in pixel 34 is asserted (and charge on the floating diffusion is ready to be sampled), S1 and S2 may be opened (deasserted) and S3 and S4 may be closed (asserted). S4 being closed couples the lower plate of capacitor $C_2$ to $V_{AA}$. This increase at the lower plate from ground to $V_{AA}$ causes the voltage of node B to be raised above $V_{AA}$. Having node B be raised above $V_{AA}$ in this manner allows for there to be a difference between the voltage at the source terminal and gate terminal of T5 (even in the event that the gate terminal is at a voltage close to $V_{AA}$). Additionally, when S3 is closed, capacitors $C_1$ and $C_2$ may discharge. Resistor R limits the peak current of $C_2$ to prevent it from excessively forward-biasing the body diodes of devices in S2 and S3.

Transistor 242, coupled to the drain of transistor 236, causes X to be low in cases where the slew rate of PIXOUT is low. T6 has a gate that receives bias voltage VLN (similar to T2 and T3). However T6 is sized to have a lower current than T2. In other words, T6 has a channel width to length ratio (W/L) that is different than the width to length ratio of T2. In general, a longer length (and therefore a smaller W/L) results in less current than a shorter length (and therefore a higher W/L). Therefore, T6 may have a longer length and a shorter W/L ratio than T2. The ratio of current through T2 compared to the current through T6 may be constant. The ratio may be greater than 2:1, greater than 3:1, greater than 5:1, greater than 10:1, less than 20:1, less than 10:1, less than 5:1, between 3:1 and 12:1, between 5:1 and 10:1, etc. In general, a higher ratio between T2/T6 currents may be desirable. However, manufacturing and layout considerations may need to be taken account to avoid overly increasing the size of T6.

The T6 size may be selected so that, at low slew rates (e.g., below the selected threshold), X remains low. When the slew rate is high (e.g., above the selected threshold), however, discharge of $C_1$ and $C_2$ is high, resulting in X being raised high. In other words, T6 is always pulling down node X. However, when the slew rate is high enough (e.g., exceeds the slew rate threshold), the discharge from $C_1$ and $C_2$ is sufficiently high to raise X and flip the output of latch circuit 240. The output of latch circuit 240 may initially be low (e.g., T4 is deasserted), with adjustable current source 202 having a bias current at a corresponding first magnitude. If X is raised high enough to flip the latch circuit (e.g., if the slew rate exceeds the threshold), the latch circuit output flips to be high (e.g., T4 is asserted). This causes the bias current from adjustable current source 202 to increase from the first magnitude to a second, greater magnitude. Then, if the slew rate drops below the threshold, the latch circuit output flips back to being low, T4 is deasserted, and the bias current from adjustable current source 202 drops back to the first magnitude.

When the PIXOUT slew rate is high, excess current may pass through transistor 244 (T7). A small amount of current (determined by the T2/T6 current ratio) passes through T6. The remaining current passes through T7. Because the gate terminal of T7 is coupled to node X, T7 also sets a ceiling on node X. If care is not taken, T7 may set a ceiling on node X below the threshold for triggering latch circuit 240 (thus preventing the current source from being boosted during settling). T7 may therefore be sized to allow X to pass the threshold that triggers inverter 238 and latch circuit 240 appropriately. In an alternate embodiment, the drain of T7 is connected to its gate, namely node X, making it a diode-connected clamp. Nevertheless, the constraint on the sizing of T7 given above still applies.

Transistor 212 has a gate terminal that receives control signal VCASC. The S-input of latch circuit 240 may receive a control signal S. The S1, S2, S3, and S4 transistors may receive corresponding control signals (possibly based on a single control signal as discussed above). Control signals VCASC, S, and the control signals for S1, S2, S3, and S4 may be provided by row control circuitry (e.g., row control circuitry 40 in FIG. 2) over control paths (e.g., control paths 36 in FIG. 2).

It should be noted the arrangement of pixel 34 herein is merely illustrative. In general, any desired pixel circuitry may be used with the readout circuitry shown in connection with FIGS. 5 and 6. The pixel circuitry may include an anti-blooming transistor, a dual conversion gain transistor, a dual conversion gain capacitor, one or more overflow capacitors, one or more overflow transistors, one or more charge storage regions in addition to the floating diffusion region, etc. The readout circuitry of FIGS. 5 and 6 may be used in an image sensor that operates with a rolling shutter (in which each row of pixels sequentially captures an image) or a global shutter (in which every pixel in the image sensor simultaneously captures an image).

The foregoing is merely illustrative of the principles of this invention and various modifications can be made by those skilled in the art. The foregoing embodiments may be implemented individually or in any combination.

What is claimed is:
1. An image sensor comprising:
   imaging pixels;
   a column output line that is coupled to a column of the imaging pixels and that is configured to provide an output voltage;
   an adjustable current source that is coupled to the column output line; and
   control circuitry that is configured to control the adjustable current source based on a slew rate of the output voltage, wherein the adjustable current source is configured to provide a bias current at a first magnitude when the slew rate is below a threshold.
2. The image sensor defined in claim 1, wherein the adjustable current source is configured to provide the bias current at a second magnitude that is greater than the first magnitude when the slew rate is above the threshold.
3. The image sensor defined in claim 1, wherein the control circuitry is configured to increase a magnitude of the bias current provided by the adjustable current source in response to the slew rate exceeding the threshold.
4. The image sensor defined in claim 3, wherein the control circuitry is configured to assert a transistor in the adjustable current source to increase the magnitude of the bias current provided by the adjustable current source.
5. The image sensor defined in claim 1, wherein the image sensor further comprises:
   sample and hold circuitry that is configured to sample the output voltage.

6. The image sensor defined in claim 1, wherein the output voltage is associated with a selected one of the imaging pixels in the column of the imaging pixels.

7. The image sensor defined in claim 1, wherein the adjustable current source comprises first and second transistors coupled in series between the column output line and ground and wherein the first and second transistors have respective first and second gate terminals that are both coupled to a first bias voltage supply terminal.

8. The image sensor defined in claim 7, wherein the adjustable current source further comprises a cascode transistor that is coupled between the first transistor and the column output line.

9. The image sensor defined in claim 7, wherein the adjustable current source further comprises a third transistor that has:
- a first terminal coupled to a first node that is interposed between the first and second transistors;
- a second terminal coupled to ground; and
- a third gate terminal that receives a control signal from the control circuitry.

10. The image sensor defined in claim 9, wherein the control circuitry comprises a source follower transistor that has a fourth gate terminal that is coupled to the column output line.

11. The image sensor defined in claim 10, wherein the control circuitry further comprises:
- a fourth transistor coupled between the source follower transistor and a second node;
- a first capacitor coupled between the second node and ground;
- a second capacitor coupled to the second node;
- a fifth transistor coupled between the second node and a second bias voltage supply terminal;
- a sixth transistor coupled between the second capacitor and the second bias voltage supply terminal; and
- a seventh transistor coupled between the second capacitor and ground.

12. The image sensor defined in claim 11, wherein the control circuitry further comprises:
- an eighth transistor coupled between a drain terminal of the source follower transistor and ground, wherein the eighth transistor has a fifth gate terminal that is coupled to the first bias voltage supply terminal; and
- a ninth transistor coupled between a source terminal of the source follower transistor and ground, wherein the ninth transistor has a sixth gate terminal that is coupled to a third node and wherein the third node is interposed between the source follower transistor and the eighth transistor.

13. An image sensor comprising:
imaging pixels;
a column output line that is coupled to a column of the imaging pixels and that is configured to provide an output voltage;
an adjustable current source that is coupled to the column output line; and
control circuitry that is configured to control the adjustable current source based on a slew rate of the output voltage, wherein the adjustable current source comprises first and second transistors coupled in series between the column output line and ground and wherein the first and second transistors have respective first and second gate terminals that are both coupled to a first bias voltage supply terminal.

14. The image sensor defined in claim 13, wherein the adjustable current source further comprises a cascode transistor that is coupled between the first transistor and the column output line.

15. The image sensor defined in claim 13, wherein the adjustable current source further comprises a third transistor that has:
- a first terminal coupled to a first node that is interposed between the first and second transistors;
- a second terminal coupled to ground; and
- a third gate terminal that receives a control signal from the control circuitry.

16. The image sensor defined in claim 15, wherein the control circuitry comprises a source follower transistor that has a fourth gate terminal that is coupled to the column output line.

17. The image sensor defined in claim 16, wherein the control circuitry further comprises:
- a fourth transistor coupled between the source follower transistor and a second node;
- a first capacitor coupled between the second node and ground;
- a second capacitor coupled to the second node;
- a fifth transistor coupled between the second node and a second bias voltage supply terminal;
- a sixth transistor coupled between the second capacitor and the second bias voltage supply terminal; and
- a seventh transistor coupled between the second capacitor and ground.

18. The image sensor defined in claim 17, wherein the control circuitry further comprises:
- an eighth transistor coupled between a drain terminal of the source follower transistor and ground, wherein the eighth transistor has a fifth gate terminal that is coupled to the first bias voltage supply terminal; and
- a ninth transistor coupled between a source terminal of the source follower transistor and ground, wherein the ninth transistor has a sixth gate terminal that is coupled to a third node and wherein the third node is interposed between the source follower transistor and the eighth transistor.

19. The image sensor defined in claim 18, wherein the control circuitry further comprises:
- an inverter having an input terminal that is coupled to the third node; and
- a latch circuit having a first input coupled to an output of the inverter, a second input, and an output that provides the control signal to the third gate terminal.

20. An image sensor comprising:
imaging pixels;
a column output line that is coupled to a column of the imaging pixels and that is configured to provide an output voltage;
an adjustable current source that is coupled to the column output line; and
control circuitry that is configured to increase a magnitude of a bias current provided by the adjustable current source in response to a slew rate of the output voltage being greater than a threshold.

* * * * *